United States Patent
Elend

(10) Patent No.: US 7,620,728 B2
(45) Date of Patent: Nov. 17, 2009

(54) METHOD OF MONITORING THE COMMUNICATION IN A NETWORK

(75) Inventor: Bernd Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 309 days.

(21) Appl. No.: 10/545,051

(22) PCT Filed: Feb. 4, 2004

(86) PCT No.: PCT/IB2004/000275

§ 371 (c)(1),
(2), (4) Date: Aug. 10, 2005

(87) PCT Pub. No.: WO2004/073317

PCT Pub. Date: Aug. 26, 2004

(65) Prior Publication Data

US 2006/0136580 A1  Jun. 22, 2006

(30) Foreign Application Priority Data

Feb. 13, 2003 (EP) .................................. 03100318

(51) Int. Cl.
*G06F 15/16* (2006.01)
(52) U.S. Cl. ....................... 709/237; 709/208
(58) Field of Classification Search ................ 709/207, 709/223, 224, 251, 242, 208; 700/1–3
See application file for complete search history.

(56) References Cited

U.S. PATENT DOCUMENTS

| | | | | |
|---|---|---|---|---|
| 4,562,539 A | * | 12/1985 | Vince | 709/214 |
| 5,003,533 A | * | 3/1991 | Watanabe | 370/258 |
| 5,245,616 A | * | 9/1993 | Olson | 714/748 |
| 5,410,723 A | * | 4/1995 | Schmidt et al. | 712/18 |
| 5,459,725 A | * | 10/1995 | Bodner et al. | 370/390 |
| 5,506,838 A | * | 4/1996 | Flanagan | 370/258 |
| 5,742,842 A | * | 4/1998 | Suetake et al. | 712/3 |
| 6,032,218 A | | 2/2000 | Lewin et al. | |
| 6,092,220 A | * | 7/2000 | Palmer et al. | 714/43 |
| 6,529,960 B2 | * | 3/2003 | Chao et al. | 709/238 |
| 7,095,739 B2 | * | 8/2006 | Mamillapalli et al. | 370/390 |

OTHER PUBLICATIONS

Demmeler, et al: "A Universal Communcation Model for an Automotive System Integration Platform", Proceedings of the Date 2001 on Design, Automation and Test in Europe, pp. 47-54.

Cena et al: "New Efficient Communication Services for ISO 11898 Networks", Computer Standard & Interfaces 22 (2000), pp. 61-74.

* cited by examiner

*Primary Examiner*—Andrew Caldwell
*Assistant Examiner*—Oleg Survillo

(57) ABSTRACT

Described is a method of monitoring the communication in a group of data processing units, wherein a data processing unit transmits data signals to other data processing units for carrying out certain operations. The remarkable thing about the invention is that, upon reception of a data signal from the transmitting data processing unit, every other data processing unit answers both the transmitting data processing unit and the other data processing units by way of an appropriate acknowledgement.

10 Claims, 4 Drawing Sheets

METHOD OF MONITORING THE COMMUNICATION IN A NETWORK

Figure 1:
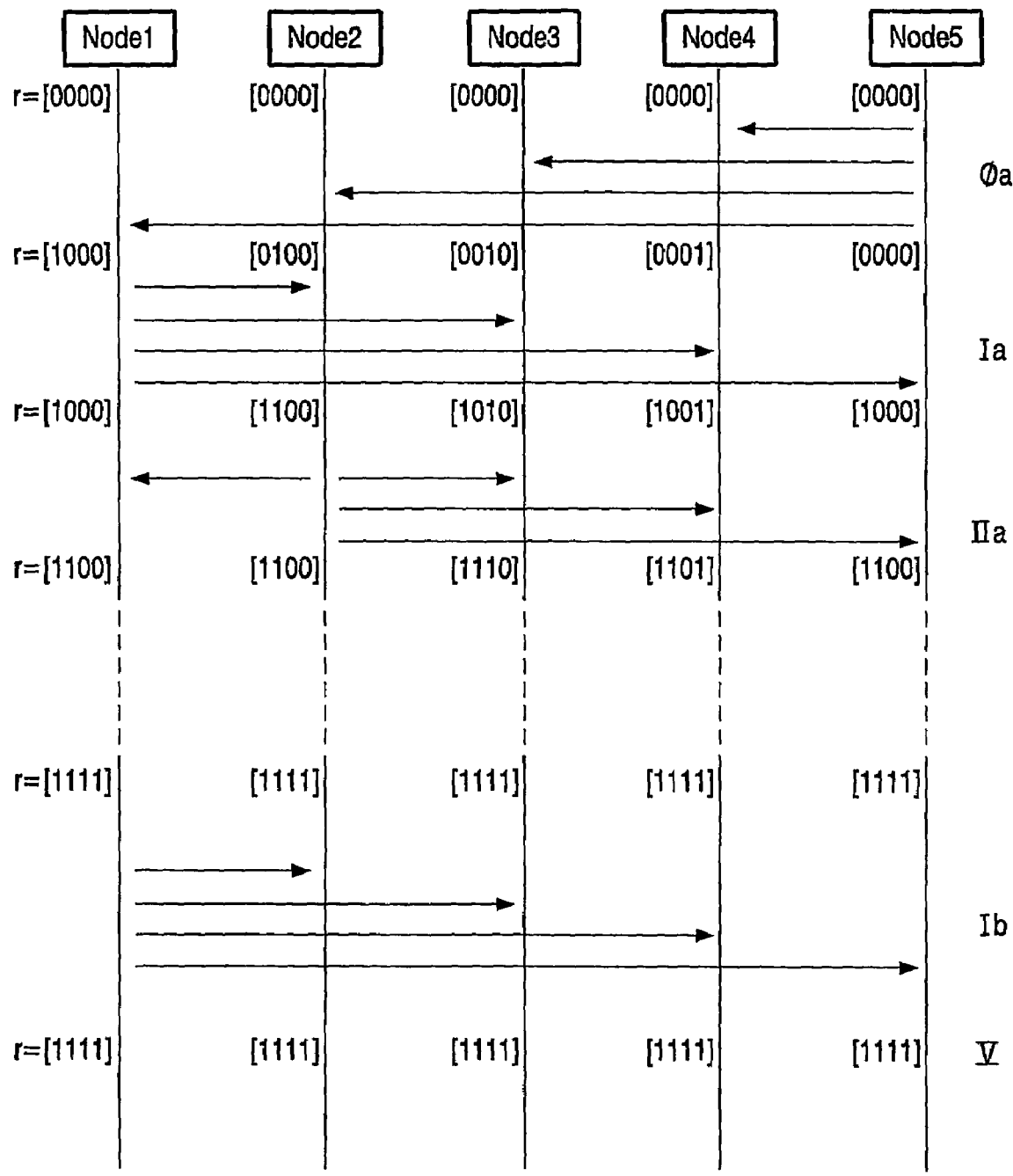

The invention relates to a method of monitoring the communication in a group of data processing units, wherein a data processing unit transmits data signals to other data processing units for carrying out certain operations.

In many applications, several data processing units are interconnected via a communication network. For this purpose, a higher-level central unit (server) is customarily provided which transmits data signals to the lower-level data processing units (clients), data exchange between the data processing units being possible of course.

As regards the data that are transmitted between the units, it must often be ensured that the addressee has correctly received and further processed the data. This is important, in particular, in the case of safety-relevant applications or, in individual cases, of vital importance even. By way of illustration, the following example is given: it is supposed that in the case of a motor vehicle having a brake system comprising mechanical components as well as data processing units for controlling the individual brakes at each one of the four wheels and a central unit, which are networked (for example an anti-lock brake system), during a braking operation triggered by an appropriate command from the central unit, only the data processing units for the left brakes understand and carry out the command, as a result of which a fatal, if not even life-threatening faulty operation of the motor vehicle would occur.

For the state of the art reference is made to U.S. Pat. No. 6,032,218 A as well as to the articles "A Universal Communication Model for an Automotive System Integration Platform" by Thilo Demmeler and Paolo Giusto in "Proceedings of the DATE 2001 on Design, automation and test in Europe" (see pages 47 to 54 of said document) and "New efficient communication services for ISO 11898 networks" by Gianluca Cena and Adriano Valenzano in "Computer Standard & Interfaces 22 (2000)" (see pages 61 to 74 of said document).

It is an object of the present invention to provide a reliable method of monitoring the communication in a network.

This object is achieved by proposing, in accordance with the invention, a method of monitoring the communication in a group of data processing units, wherein a data processing unit transmits data signals to other data processing units for carrying out certain operations, and upon reception of a data signal from the transmitting data processing unit, every other data processing unit answers both the transmitting data processing unit and the other data processing units by way of an appropriate acknowledgement.

By virtue of the method in accordance with the invention, each data processing unit now knows whether or not the other data processing units have received the data signals. By means of the invention, transmitter and receiver thus gain a uniform insight as to whether and which one of the receivers have correctly received the transmitted data. The invention takes into account that the data transmission may become disturbed at any time. Not only the actual data signals may become disturbed, but also the reception acknowledgements sent back.

A further advantage of the method in accordance with the invention resides in that the acknowledgements take place on the application level rather than on the protocol level. In this respect, it is usually sufficient that these acknowledgements are sent back only by those data processing units for which the transmitted data signals are relevant.

The transmitting data processing unit may be a higher-level central unit (server) and the other data processing units, which receive and convert the transmitted data signal, may be lower-level data processing units (clients). However, a configuration that is also conceivable is one in which all data processing units enjoy equal rights.

Preferably, each data processing unit generates a status signal of its own that contains at least its own acknowledgement. Each data processing unit thus contains its own status signal.

In a further, currently much preferred embodiment, the answering data processing units answer in a chronologically defined sequence, as a result of which at least a first data processing unit, and subsequently a next, second data processing unit, etc., answer, where the first answering data processing unit transmits a status signal that contains only its own acknowledgement, the second answering data processing unit subsequently transmits a status signal that contains its own acknowledgement and, besides, also the acknowledgement of the first data processing unit, and, if applicable, every further data processing unit that answers next, transmits a status signal that contains its own acknowledgement and, besides, also the acknowledgements of all data processing units that have answered previously. A type of cascade is thus formed wherein the subsequent data processing units transmit the acknowledgements of the preceding data processing units together with their own acknowledgement to the other data processing units.

Preferably, the status signal of each data processing unit is supplemented in an appropriate manner by the status signals received from the other data processing units, which takes place, in particular, by means of a combining operation. All data processing units thus gradually send their current status signal, the receiving units appropriately updating their own status signal taking into account the status signal received from each of the other data processing units.

After the data processing unit which, in accordance with the chronologically defined sequence, is the last to answer has sent the status signal containing its own acknowledgement and, in addition, the acknowledgements of all data processing units that have answered previously, all data processing units should expediently send their thus updated status signal a second time. By virtue of this second cycle, the identification certainty is increased already by the mere fact that the data processing units answer a second time. The difference with respect to the first cycle, however, is that in the case of a proper reception at all data processing units, at the end of the first cycle the status signals of all data processing units have an identical value and thus in the second cycle all data processing units must send the same status signal. Consequently, the determination in the second cycle whether all status signals have the same value or not forms a further criterion for judging whether the reception at all data processing units has been correct or not.

Each data processing unit can thus determine whether another data processing unit knows that it has received the data signal from the central unit. Thus, a data processing unit that has received correctly, yet knows that all other data processing units believe that it has not received correctly, may also behave as if it had not received correctly. It is thus ensured that all data processing units behave in the manner expected by each one of the other data processing units.

In a further preferred embodiment, the status signals generated by all data processing units have the same number of signal elements corresponding to the number of answering data processing units, each signal element being associated with a specific answering data processing unit and indicating the acknowledgement thereof. In this context, for example the signal element that comes first in the status signal designates the data processing unit that answers first in the chronologically defined sequence, the second signal element designates the second data processing unit that answers next, etc. As regards the transmitting data processing unit, however, there must not be a further signal element, because this unit is the transmitter of the data signals for which a uniform view must exist.

Each signal element should customarily assume at least a first state and a second state, of which, for example, the first state indicates a correct reception and the second state indicates no reception or a reception disturbance. The status signals generated by all data processing units expediently exhibit a vector signal which is composed of vector elements forming the signal elements, the vector signal customarily being a bit-vector and, consequently, the vector elements consisting of bits, of which, for example, a "1" indicates a correct reception and a "0" indicates no reception or a reception disturbance.

If the status signal is composed of a bit-vector, then the combination should preferably be carried out as an OR combination.

To make sure that each data processing unit knows a priori the transmission moment of any one of the other data processing units, the communication between the data processing units should preferably be time-controlled, in particular in a defined time pulse.

The above-described communication may take place in a group of data processing units forming a part of a network or an entire network.

These and other aspects of the invention are apparent from and will be elucidated with reference to the embodiment(s) described hereinafter.

Figure 2:
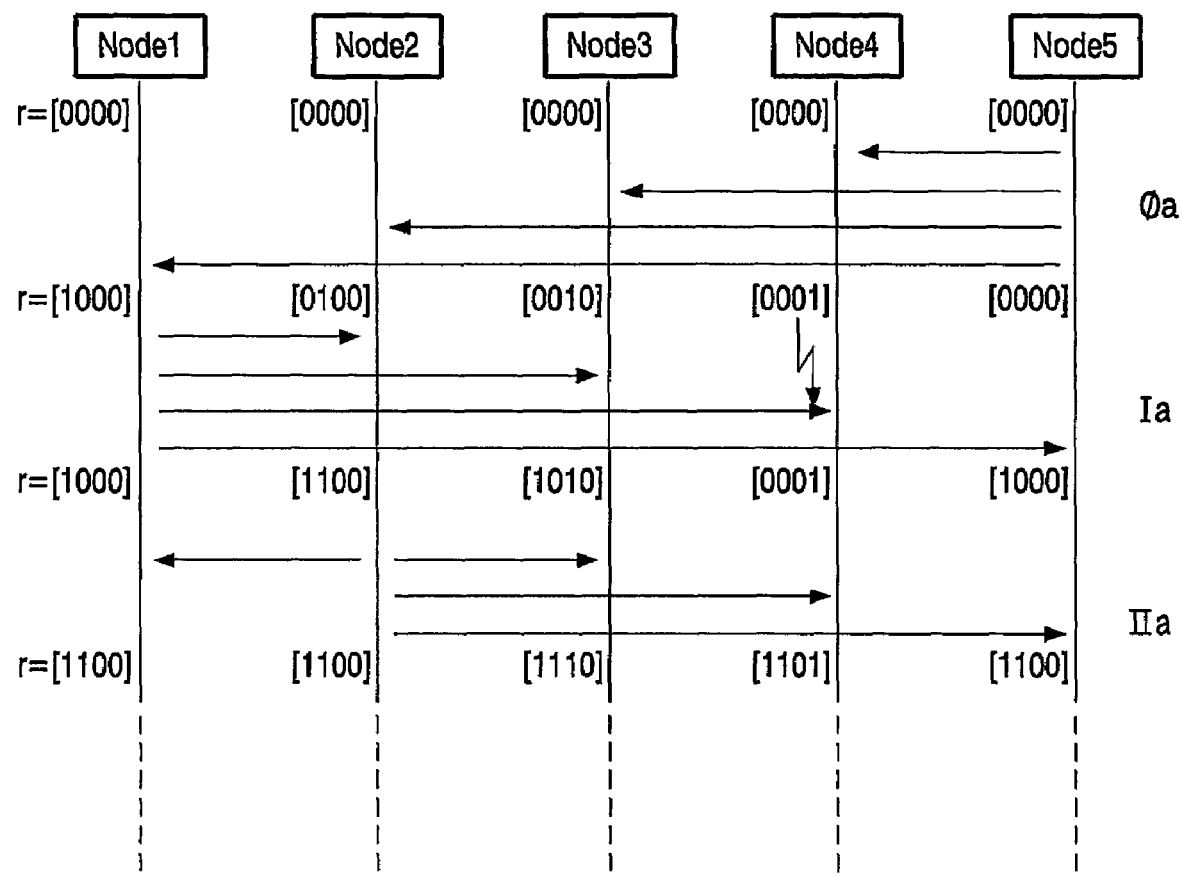

In the drawings:

FIG. 1 diagrammatically shows a signal diagram for a communication network comprising a central unit and four data processing units in the case of a correct reception;

FIG. 2 diagrammatically shows a signal diagram for a communication network comprising a central unit and four data processing units in the case where the reception at one data processing unit is briefly disturbed; and FIG. 3 diagrammatically shows a signal diagram for a communication network comprising a central unit and four data processing units for a first situation (a) where the transmission of a status signal from one data processing unit to all other units is disturbed for a short period of time, and for a second situation (b) where the transmission of the status signal from the data processing unit to the other units is disturbed for a longer period of time.

FIGS. 1 through 3 diagrammatically show examples of signal diagrams for a communication network, which is not shown in detail, comprising a higher-level central unit and four lower-level data processing units, the data processing units being designated as "node 1", "node 2", "node 3" and "node 4", and the central unit being designated as "node 5". The individual units are interconnected via a data bus, which is not shown. Such a network structure is used, inter alia, in control or regulation applications, such as for example in the brake system of motor vehicles; in said application, the central unit forms a control device and transmits control signals as data signals to the data processing units, which, in dependence on these data signals, appropriately drive, for example, brakes at each wheel of a motor vehicle.

As regards the data which are transmitted between the units, it must be ensured, particularly in critical applications such as a brake system of a motor vehicle, that the addressee has correctly received and further processed said data. To achieve this, transmitter and receiver must gain a uniform insight as to whether the transmitted data were received correctly and which one of the receivers have received said data correctly. To this end, the data processing units must answer by transmitting a reception acknowledgement. In this respect, it must be taken into account however that the data transmission may become disturbed at any moment in time. Not only the actual data may become disturbed but also the reception acknowledgements sent back. Thus, if for example in the case of a braking action only the left brakes in the motor vehicle would understand the brake command, then fatal, or possibly even life-threatening faulty behavior of the motor vehicle would occur. Therefore it is very important that each unit knows whether or not the other units have received the command.

Besides, a time-controlled communication is advantageous because each unit then knows a priori the transmission moment of any one of the other units.

Each unit remembers a status signal which, in accordance with the example shown in the Figures, is composed of a four-digit bit-vector $\Gamma$, which contains a string of four ones or zeros. In the example shown, the first bit in the bit-vector $\Gamma$ designates the first data processing unit "node 1", the second bit designates the second data processing unit "node 2", the third bit designates the third data processing unit "node 3" and the fourth bit designates the fourth data processing unit "node 4". In the example shown, a "1" bit indicates a correct reception at the associated data processing unit; a "0" however indicates that nothing was received or that the reception was disturbed. The central unit "node 5", on the other hand, is not assigned a bit because this unit is the transmitter of the data signals, for which there must be a uniform view. However, the central unit also receives and remembers such a bit-vector.

After the central unit "node 5" has transmitted a data signal (for example a brake command), each receiving data processing unit places the bit assigned to it in the locally available bit-vector in dependence on whether a correct value was received ("1") or not ("0"). As the Figures show, all data processing units now gradually send their current bit-vector, and the receiving data processing units update their own bit-vector by OR combination with the bit-vector received each time from any of the other data processing units.

FIG. 1 shows a situation where all data processing units "node 1" to "node 4" receive correctly. In the starting state, the bits are set to zero in the bit-vectors of all units. If the central unit "node 5" subsequently sends a data signal to the four data processing units "node 1" to "node 4", as shown in step 0a in FIG. 1, in each data processing unit, the associated bit of the bit-vector is set to "1", so that the bit-vector $\Gamma$ in the first data processing unit "node 1" obtains the value 1000, in the second data processing unit "node 2" the value 0100 etc. In the next step, Ia, the first data processing unit "node 1" sends by way of acknowledgement its bit-vector $\Gamma=(1000)$ to the other units, and in the other data processing units "node 2", "node 3" and "node 4", the associated bit-vectors are each appropriately combined by OR combination with the received bit-vector of the first data processing unit, as a result of which the value of the bit-vector in the second data processing unit "node 2" changes from (0100) to (1100), in the third data processing unit "node 3" from (0010) to (1010), in the fourth data processing unit "node 4" from (0001) to (1001), and in the central unit "node 5" from (0000) to (1000). Subsequently the second data processing unit "node 2" transmits its thus updated bit-vector $\Gamma=(1100)$ to the other three data processing units, where a (further) OR combination with the associated bit-vectors takes place in the same manner as described above; this is diagrammatically shown in the next step IIa in FIG. 1. In the next two last steps IIIa and IVa, not shown in FIG. 1 for clarity of arrangement, also the two other data processing units "node 3" and "node 4" each send their correspondingly updated bit-vectors, as a result of which the bit-vectors in all units eventually have the value (1111).

It is additionally noted that also in the central unit "node 5" an OR combination of the associated bit-vector with the received bit-vectors takes place, as a result of which the bits are successively changed from "0" to "1".

After this first interrogation cycle, a second cycle is carried out in which, in the example of FIG. 1 (correct reception), all units transmit only bit-vectors having the same value "(1111)", as is diagrammatically shown in step Ib, which corresponds to step Ia, however with this difference that in step Ib the first data processing unit "node 1" sends a bit-vector having a value $\Gamma=(1111)$.

After termination of this second interrogation cycle, the bit-vectors in all units remain set to the value (1111), as is diagrammatically shown in the final step V in FIG. 1.

If no disturbances occur, as in the case of the situation shown in FIG. 1, already after the first cycle each unit knows of every other unit whether the data signal was received or not.

FIG. 2 shows a situation where a brief reception disturbance occurs in the fourth data processing unit "node 4", the steps 0a, Ia and IIa shown corresponding to the identical steps in FIG. 1. In step Ia of FIG. 2 it is visible that the fourth data processing unit "node 4" does not receive the acknowledgement from the first data processing unit "node 1", so that in the bit-vector of the fourth data processing unit "node 4" the first bit associated with the first data processing unit is not set to "1", but remains set to "0". As, however, in the example of FIG. 2 the fourth data processing unit "node 4" could not receive the bit-vector from the first data processing unit "node 1" due to a brief disturbance, the bit-vector of the fourth data processing unit "node 4" is appropriately corrected in the subsequent step Ia, i.e. when the second data processing unit "node 2" sends its bit-vector, which is received without disturbances, inter alia, also by the fourth data processing unit "node 4". The rest of the procedure corresponds to that described with reference to FIG. 1.

Figure 3A:
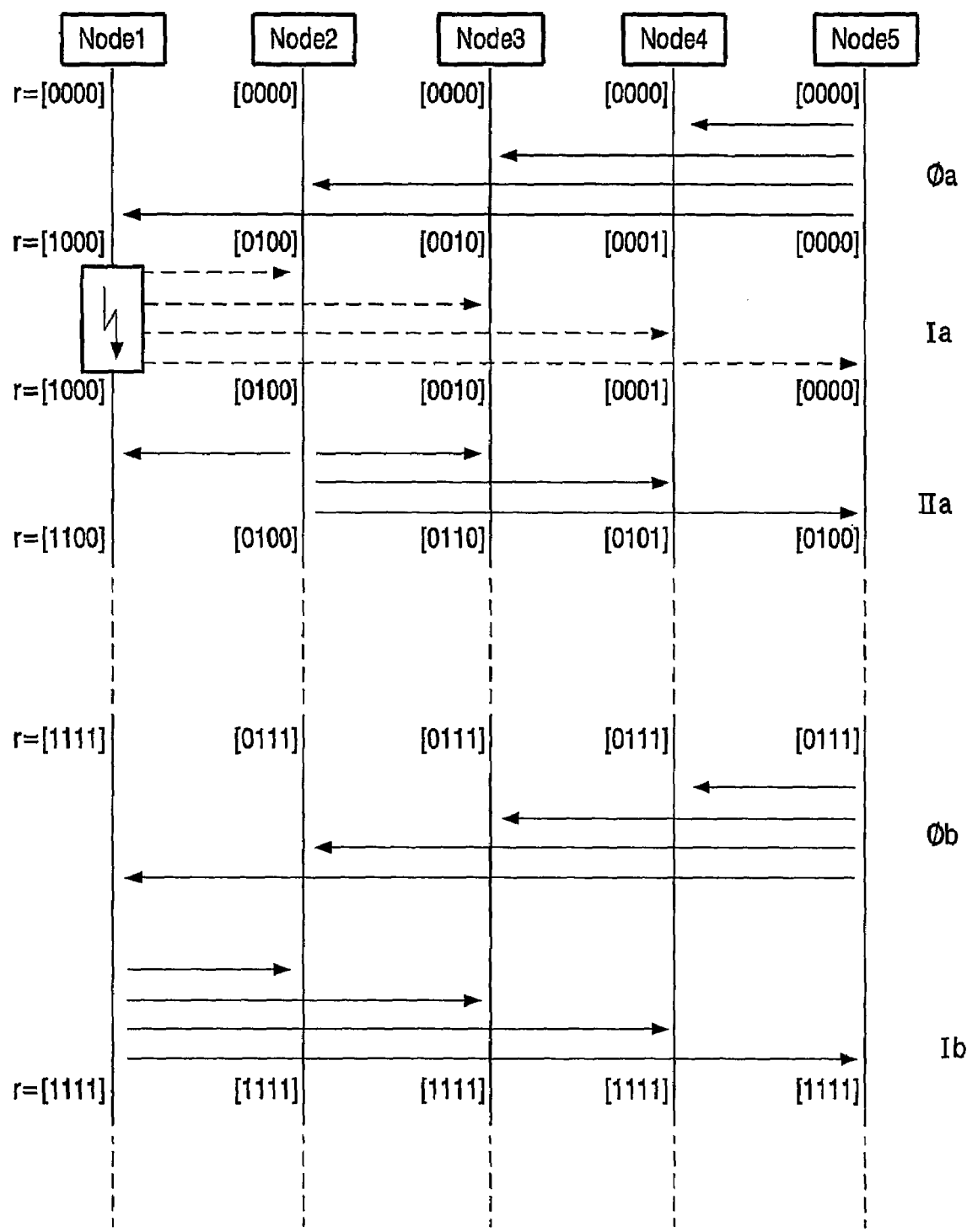

FIG. 3a shows a situation in which, unlike that shown in FIG. 2 where there is a selective disturbance between two data processing units, the bit vector sent by the first data processing unit "node 1" is destroyed completely, so that all the other units do not receive this vector. In this case, the steps 0a, Ia, IIa and Ib correspond to the identical steps in FIG. 1, step 0b (beginning of the second cycle) being additionally shown. Step Ia clearly shows that the bit vectors of the second to fourth data processing unit "node 2" to "node 4" and of the central unit "node 5" remain unchanged since in all these cases the first bit associated with the first data processing unit is not set to "1", but remains set to "0". This error continues in the subsequent steps IIIa and Iva (not shown), so that at the end of the first cycle the bit vector of the first data processing unit "node 1" is correctly set to (1111), yet the bit vector of each of the other units is set to (0111) only. The latter setting also applies to the central unit "node 5". At the beginning of the second cycle the central unit "node 5" thus sends the bit vector $\Gamma=(0111)$, as shown in step 0b. Since in the example shown in FIG. 3a the disturbance has been eliminated in the meantime, the answer from the first data processing unit "node 1" is bit vector $\Gamma=(1111)$, which is correctly received now by the other units, as a result of which the bit vectors in the other units are also set to (1111). In the subsequent steps IIb to IVb (not shown) of the second interrogation cycle the other data processing units gradually send their current bit vector; however, as this has already been set to (1111) in all cases, no further changes take place. At the end of the second cycle the bit vectors of all units thus are correctly set to (1111), so that all units have recognized that the data transmission has taken place correctly.

Figure 3B:
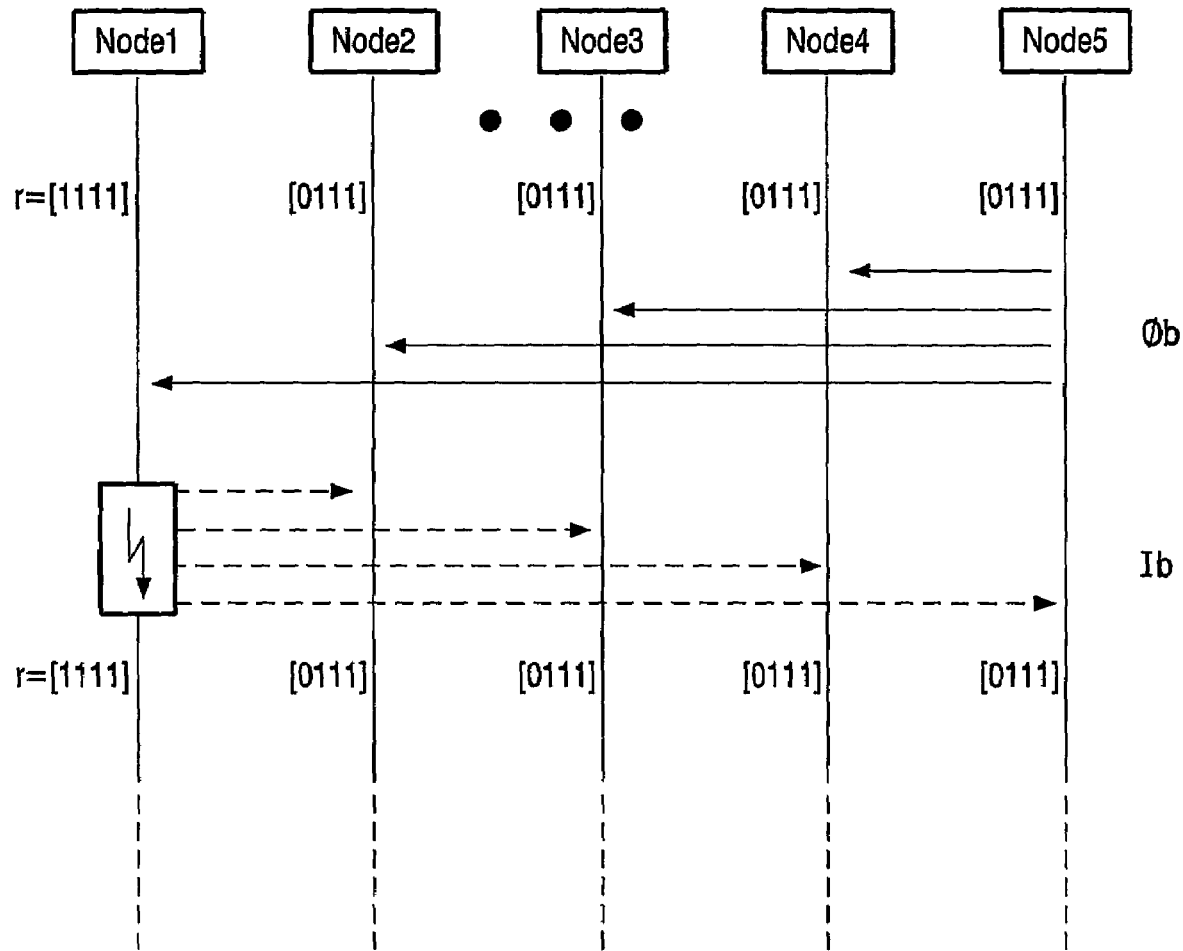

In the case shown in FIG. 3b, however, the disturbance whereby the bit vector sent by the first data processing unit "node 1" is completely destroyed and thus not received by the other units, is not eliminated during the second cycle, so that also at the end of the second cycle the bit vectors remain unchanged as compared to the result of the first cycle. Since the second to fourth data processing units "node 2" to "node 4" as well as the central unit "node 5" each send a bit vector having the value (0111), the first data processing unit "node 1" is informed that all other units believe that "node 1" has not received the data (although this is not true, since "node 1" was capable of sending its bit vector, yet this vector was totally destroyed in the course of the transmission process). Consequently, the first data processing unit "node 1" can now behave accordingly.

For the sake of completeness it is further noted that in the example described hereinabove, "node 5" is provided as the higher-level central unit. It is alternatively conceivable, however, that "node 1" to "node 5" are provided as data processing units that enjoy equal rights in the example described herein.

The method described thus allows each data processing unit to establish whether another data processing unit knows that it has received the command. Thus, a data processing unit that has received correctly, yet knows that all other data processing units believe that it has not received correctly, can behave as though it had not received correctly. It is thus ensured that all data processing units behave in a manner as expected by each one of the other data processing units.

The invention claimed is:

1. A method of monitoring the communication in a group of data processing units that are interconnected via a data bus, wherein a data processing unit of the group of data processing units transmits data signals to each of the other data processing units in the group for carrying out certain operations, the data processing unit in the group that transmits the data signals being the transmitting data processing unit and the remaining data processing units in the group being the other data processing units, the method comprising:

upon reception of a data signal from the transmitting data processing unit, each of the other data processing units in the group answers both the transmitting data processing unit and each of the other data processing units except itself by way of an appropriate acknowledgement of receipt of the data signal, which is sent back to the transmitting data processing unit and to each of the other data processing units in the group except itself;

wherein each of the other data processing units in the group generates a status signal of its own that contains at least its own acknowledgement; and wherein each of the other data processing units in the group answers in a chronologically defined sequence, as a result of which at least a first data processing unit of the other data processing units in the group and subsequently a next, second data processing unit of the other data processing units in the group, answer both the transmitting data processing unit and each of the other data processing units in the group except itself, where the first data processing unit transmits as its answer a status signal that contains only its own acknowledgement, the second data processing unit transmits as its answer a status signal that contains its own acknowledgement and, besides, also the acknowledgement of the first data processing unit; and, if applicable, every further data processing unit of the other data processing units in the group that answers next, transmits as its answer a status signal that contains its own acknowledgement and, besides, also the acknowledgements of each of the other data processing units in the group that have answered previously;

wherein the status signals generated by each of the other data processing units in the group have the same number of signal elements, wherein the number of signal elements in each of the status signals corresponds to the number of the other data processing units in the group, each signal element being associated with a specific data processing unit of the other data processing units in the group and indicating the acknowledgement thereof.

2. A method as claimed in claim 1, wherein the status signal of each of the other data processing units in the group is supplemented by the status signals received from each of the other data processing units in the group except itself.

3. A method as claimed in claim 2, wherein the status signal of each of the data processing units in the group is combined with the status signals received from the other data processing units in the group.

4. A method as claimed in claim 2, wherein, after the data processing unit which is the last to answer in the sequence has sent the status signal containing its own acknowledgement and, in addition, the acknowledgements of each of the other data processing units in the group that have answered previously, each of the other data processing units in the group send an updated status signal to the transmitting data processing unit and each of the other data processing units in the group except itself.

5. A method as claimed in claim 1, wherein each signal element may assume at least a first state and a second state, of which the first state indicates a correct reception and the second state indicates no reception or a reception disturbance.

6. A method as claimed in claim 1, wherein the status signals generated by each of the other data processing units exhibit a vector signal, which is composed of vector elements forming the signal elements.

7. A method as claimed in claim 6, wherein the vector signal is a bit-vector and the vector elements are composed of bits.

8. A method as claimed in claim 7, wherein a "1" in the bits indicates a correct reception and a "0" indicates no reception or a reception disturbance.

9. A method as claimed in claim 5, wherein the combination is an OR combination.

10. A method as claimed in claim 1, wherein the communication between the data processing units takes place in a time-controlled manner, particularly in a defined time pulse.

* * * * *